US009516111B2

(12) United States Patent
Oyama et al.

(10) Patent No.: US 9,516,111 B2
(45) Date of Patent: Dec. 6, 2016

(54) COMMUNICATION APPARATUS, COMMUNICATION METHOD, AND COMPUTER PROGRAM PRODUCT

(75) Inventors: Yuichiro Oyama, Fuchu (JP); Takeshi Ishihara, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 39 days.

(21) Appl. No.: 13/537,477

(22) Filed: Jun. 29, 2012

(65) Prior Publication Data
US 2013/0080499 A1 Mar. 28, 2013

(30) Foreign Application Priority Data

Sep. 28, 2011 (JP) .................................. 2011-212744

(51) Int. Cl.
*G06F 15/16* (2006.01)
*H04L 29/08* (2006.01)
*H04N 21/414* (2011.01)
*H04N 21/443* (2011.01)

(52) U.S. Cl.
CPC .... *H04L 67/1097* (2013.01); *H04N 21/41407* (2013.01); *H04N 21/4436* (2013.01)

(58) Field of Classification Search
CPC ...... G06F 15/16; G06F 17/30; H04L 67/1097; H04N 21/41407
USPC ........................................ 709/203, 219, 246
See application file for complete search history.

(56) References Cited

U.S. PATENT DOCUMENTS 5,625,882 A * 4/1997 Vook et al. .................. 340/7.34
8,386,819 B2 2/2013 Mizunashi
8,532,074 B2 * 9/2013 Navda et al. .................. 370/338
2004/0255008 A1 * 12/2004 Olsen et al. .................. 709/220
2005/0018624 A1 * 1/2005 Meier et al. .................. 370/318
2005/0025081 A1 * 2/2005 Wakamatsu .................. 370/311

(Continued)

FOREIGN PATENT DOCUMENTS

| JP | 2003115947 | 4/2003 |
|---|---|---|
| JP | 2003323370 | 11/2003 |
| JP | 2009-296057 | 12/2009 |

(Continued)

OTHER PUBLICATIONS

PAWP: A Power Aware Web Proxy for Wireless LAN Clients Lu et al, WMCSA 2004 IEEE.*

(Continued)

*Primary Examiner* — Brian J Gillis
*Assistant Examiner* — Steve Lin
(74) *Attorney, Agent, or Firm* — Nixon & Vanderhye, P.C.

(57) ABSTRACT

According to an embodiment, a communication apparatus includes a receiving unit, an obtaining unit, and an analyzing unit. The receiving unit is configured to receive first obtaining method information, which is sent by an information processing unit to a network and which indicates a method of obtaining first data from the network. The obtaining unit is configured to, on behalf of the information processing unit, obtain the first data based on the first obtaining method information received by the receiving unit. The analyzing unit is configured to extract, from the first data obtained by the obtaining unit, second obtaining method information that indicates a method of obtaining second data which needs to be obtained along with obtaining the first data. The obtaining unit also obtains the second data based on the second obtaining method information.

6 Claims, 9 Drawing Sheets

(56) References Cited

U.S. PATENT DOCUMENTS

| | | | |
|---|---|---|---|
| 2006/0160508 A1* | 7/2006 | Narayanaswami et al. | 455/151.2 |
| 2007/0077665 A1* | 4/2007 | Bump | G05B 19/41845 438/14 |
| 2009/0164474 A1* | 6/2009 | Noumeir | 707/10 |
| 2010/0235473 A1* | 9/2010 | Koren et al. | 709/219 |
| 2010/0332586 A1* | 12/2010 | Jogand-Coulomb et al. | 709/203 |
| 2011/0225440 A1* | 9/2011 | Kwon | H04W 52/0235 713/323 |

FOREIGN PATENT DOCUMENTS

| | | |
|---|---|---|
| JP | 2011041152 | 2/2011 |

OTHER PUBLICATIONS

Rosu et al., "PAWP: A Power Aware Web Player *Proxy* for Wireless LAN Clients", *Proc. of the Sixth IEEE Workshop on Mobile Computing Systems and Applications*, 2004, pp. 206-215.

Office Action mailed Feb. 12, 2014 in counterpart Japanese Application No. 2011-212744.

Office Action mailed Nov. 25, 2014 in counterpart Japanese Application No. 2011-212744 and English-language translation thereof.

\* cited by examiner

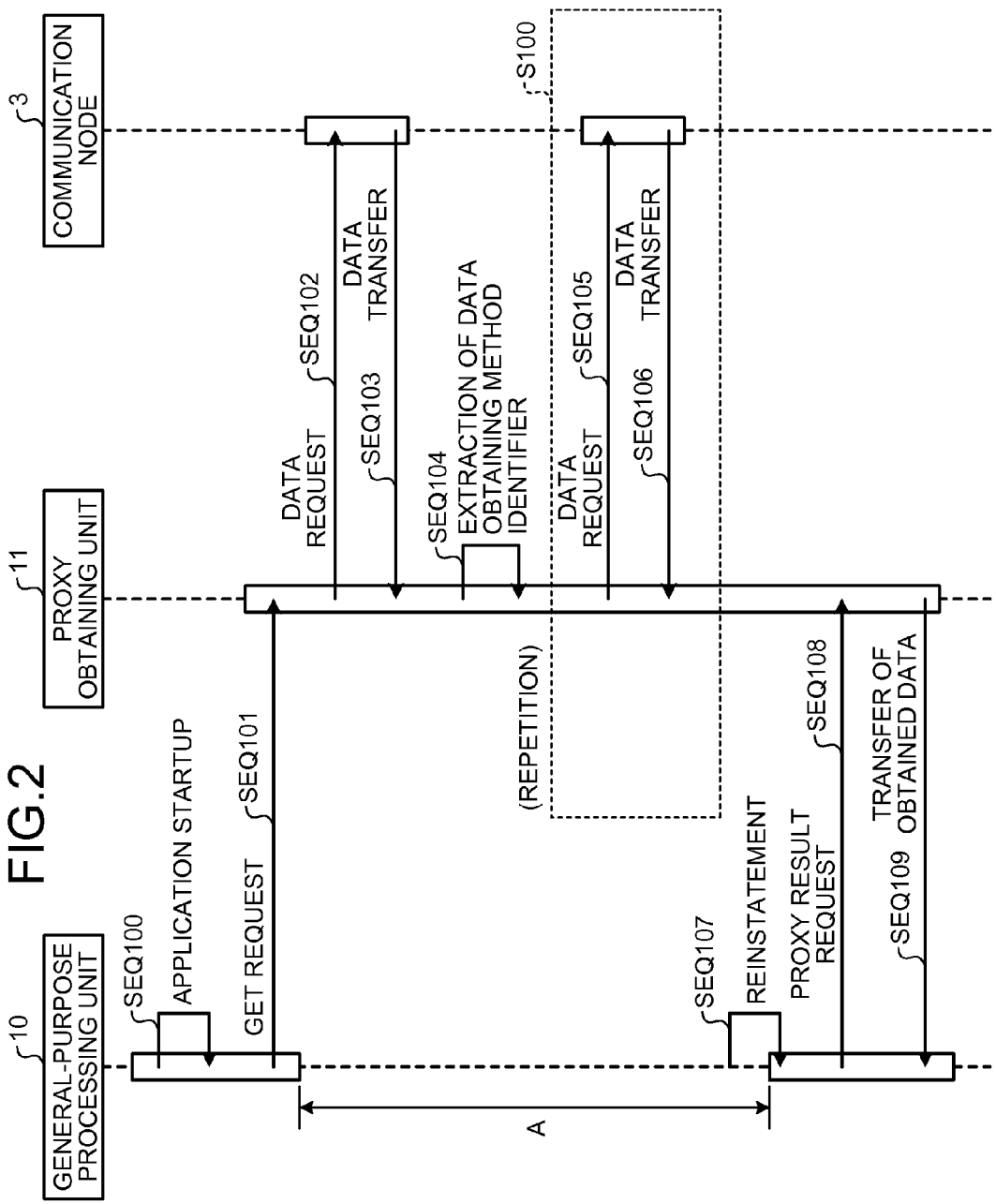

FIG.3

```
1:<html>
2:<head>
3:<title></title>
4:</head>
5:<body background="http://1.example.org/aaa/backg.jpg">
6:
7:              <img src="001.jpg">
8:              <h1>sample</h1>
9:
10:             <p>this is a sample page.</p>
11:             <dl>
12:                         <dt>list
13:                         <dd><img src="http://2.example.org/bbb/002.jpg">
14:                         <dd><img src="http://2.example.org/bbb/003.jpg">
15:                         <dd><img src="http://2.example.org/bbb/004.jpg">
16:                         <dd><img src="005.jpg">
17:             </dl>
18:
19:<object data="http://3.example.org/ccc.mpeg" type="video/mpeg" width="200" height="100"></object>
20:<a href="http://4.example.org/dddd.html"><img src="006.jpg"></a><br>
21:
22:</body>
23:</html>
```

FIG.7

```
1:<html>
2:<head>
3:<title>frame sample</title>
4:</head>
5:
6:<frameset cols="150,*" frameborder="no" scrolling="auto">
7:          <frame name="001" src="left.html" noresize>
8:          <frame name="002" src="right.html">
9:</frameset>
10:
11:<noframes>
12:          <center>
13:          [ message ]
14:          </center>
15:</noframes>
16:
17:</html>
```

FIG.8A

```
1:<html>
2:<head>
3:<title></title>
4:</head>
5:<body background="http://5.example.org/aaa/backg.jpg">
6:
7:            <h2>left page</h2>
8:            <img src="007.jpg"><br>
9:            <img src="http://6.example.org/bbb.jpg"><br>
10:           <img src="http://7.example/ccc.jpg"><br>
11:
12:</body>
13:</html>
```

FIG.8B

```
1:<html>
2:<head>
3:<title></title>
4:</head>
5:<body background="http://8.example.org/ddd/backg2.jpg">
6:
7:            <h2>right page</h2>
8:
9:            <a href="http://9.example.org/eee.html"><img src="010.jpg"></a><br>
10:           <img src="http://10.example.org/fff.jpg"><br>
11:           <object data="http://11.example.org/ggg.mpeg" type="video/mpeg" width="200" height="100"></object>
12:
13:</body>
14:</html>
```

COMMUNICATION APPARATUS, COMMUNICATION METHOD, AND COMPUTER PROGRAM PRODUCT

CROSS-REFERENCE TO RELATED APPLICATION

This application is based upon and claims the benefit of priority from Japanese Patent Application No. 2011-212744, filed on Sep. 28, 2011; the entire contents of which are incorporated herein by reference.

FIELD

Embodiments described herein relate generally to a communication apparatus, a communication method, and a computer program product.

BACKGROUND

A communication system is known in which a communication terminal downloads and obtains various types of data from another communication node that is connected via a network. For example, a technology has become popular in which a browser application (hereinafter, referred to as "browser") of a communication terminal makes use of the HTTP (which stands for HyperText Transfer Protocol) in order to access HTML files (HTML stands for HyperText Markup Language) that are stored in a Web server on the Internet and in order to download contents from the Web server according to the description in the files. Herein, contents data points to, for example, image data that is used screen formation. Generally, it is often the case that a plurality of sets of contents data is requested from a single HTML file.

Another technology is also widely known in which a proxy server is installed in between an HTTP client (communication terminal) and a Web server; the contents data that is held by the Web server and that is requested from an HTML file is stored in advance in the proxy server; and the HTTP client accesses not the Web server but the proxy server in practice.

When a request for obtaining contents data is received from an HTTP client; the proxy server accordingly obtains the contents data from a Web server. At that time, if additional contents data is required, the proxy server also obtains the additional contents data from the Web server. Once all contents data required to, for example, display a single screen is obtained, the proxy server sends the contents data to the communication terminal serving as the HTTP client.

In the communication terminal, while a screen corresponding to a particular HTML file is being viewed, if a screen corresponding to another HTML file is to be displayed, then it becomes necessary to obtain the contents data required in that screen which is to be displayed. In such a case, there has been a demand that, during the period in which the required contents data is obtained and the display is changed, a central processing unit (CPU) of the communication apparatus must be able to be switched into a sleep mode.

Meanwhile, by using a proxy server as mentioned above, it becomes possible to shorten the time taken to obtain the contents data. That opens up the possibility of reducing the power consumption of the communication apparatus. However, in such a case, it is necessary to install proxy servers at various locations, thereby causing an increase in the cost.

BRIEF DESCRIPTION OF THE DRAWINGS

FIG. 2 is a sequence diagram illustrating an example of a data obtaining operation according to the first embodiment;
FIG. 3 is a diagrammatic view illustrating an example of the details of an HTML file sent by a communication node;
FIG. 7 is a diagrammatic view illustrating an example of an HTML file for frame display;
FIG. 8 is a diagrammatic view illustrating examples of HTML files for frame display.

DETAILED DESCRIPTION

According to an embodiment, a communication apparatus includes a receiving unit, an obtaining unit, and an analyzing unit. The receiving unit is configured to receive first obtaining method information, which is sent by an information processing unit to a network and which indicates a method of obtaining first data from the network. The obtaining unit is configured to, on behalf of the information processing unit, obtain the first data based on the first obtaining method information received by the receiving unit. The analyzing unit is configured to extract, from the first data obtained by the obtaining unit, second obtaining method information that indicates a method of obtaining second data which needs to be obtained along with obtaining the first data. The obtaining unit also obtains the second data based on the second obtaining method information.

First Embodiment

Figure 1:
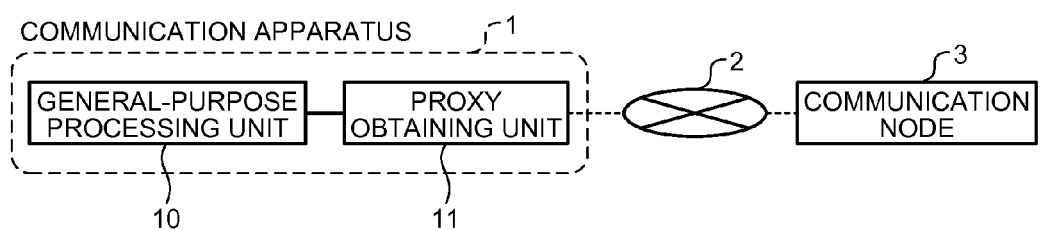
FIG. 1 is a block diagram of an exemplary communication system that can be implemented in a first embodiment.

Given below is the explanation of a communication apparatus according to a first embodiment. FIG. 1 is a block diagram of an exemplary communication system that can be implemented in the first embodiment. Herein, a communication apparatus 1 can communicate with a communication node 3 via a network 2. The communication node 3 is an information processing apparatus such as a server that is connected to the network 2. For example, when the network 2 is the Internet; the communication node 3 can be a Web server as an example.

The communication apparatus 1 includes a general-purpose processing unit 10 and a proxy obtaining unit 11. It is assumed that the general-purpose processing unit 10 can be set to perform general-purpose data processing. For example, the general-purpose processing unit 10 includes a CPU, a random access memory (RAM), and a read only memory (ROM); and runs computer programs, such as an operating system (OS) or application software, by using the RAM as a work memory.

The proxy obtaining unit 11 receives a data get request that is sent by the general-purpose processing unit 10 with respect to the communication node 3. Then, on behalf of the general-purpose processing unit 10, the proxy obtaining unit 11 issues the data get request to the communication node 3. Moreover, the proxy obtaining unit 11 receives and holds the data that is sent by the communication node 3 in response to the data get request. Then, for example, in response to a request from the general-purpose processing unit 10, the proxy obtaining unit 11 sends the data to the general-purpose processing unit 10.

Thus, according to the first embodiment, when the general-purpose processing unit 10 sends a data get request with respect to the communication node 3, the actual operation related to issuing the data get request is performed by the proxy obtaining unit 11 on behalf of the general-purpose processing unit 10. Consequently, in the communication apparatus 1, as soon as the general-purpose processing unit 10 sends a data get request with respect to the communication node 3, the general-purpose processing unit 10 can be switched to the sleep mode, which is an operating mode in which the power consumption is kept under check.

As far as reinstating of the general-purpose processing unit 10 from the sleep mode is concerned, it can be done automatically using a timer operation or can be performed by the proxy obtaining unit 11.

FIG. 2 is a sequence diagram illustrating an example of a data obtaining operation according to the first embodiment. Firstly, in the general-purpose processing unit 10, an application software (hereinafter, simply referred to as "application") for requesting data to the communication node 3 starts running (SEQ100).

When the application requires data that is held by the communication node 3; the general-purpose processing unit 10 sends, with respect to the communication node 3, a data get request as well as a data obtaining method identifier that indicates the method of obtaining data from the communication node 3 (SEQ101). In addition, the general-purpose processing unit 10 can also send storage information that indicates the method of storing the data obtained in response to the data get request. Then, the proxy obtaining unit 11 receives the data get request and the data obtaining method identifier. If the storage information is also sent, then the proxy obtaining unit 11 receives that storage information too. Upon sending the data get request and the data obtaining method identifier at SEQ101, the general-purpose processing unit 10 can switch to the sleep mode.

Assume that the Internet is used as the network 2. In that case, the communication node 3 can be configured as a Web server on the Internet and the general-purpose processing unit 10 can be configured as a browser application (hereinafter, simply referred to as "browser") running in the communication apparatus 1. Herein, the data requested to the communication node 3 by the communication apparatus 1 can be in the form of an HTML file, and the data obtaining method identifier can be in the form of a uniform resource locator (URL) of the HTML file.

As an example, when the URL of the HTML file is "http://example.com/sample.html"; the scheme name "http" indicates that the HTTP is to be used as the protocol. The character string starting from the symbol "://" up to the immediately following "/" indicates the host that holds the resource indicated by the URL. The character string following the subsequent symbol "/" indicates the details of the resource such as a file held by the host. In this way, a URL indicates the location of a resource on the Internet as well as indicates the method of obtaining that resource.

Based on the data get request and the data obtaining method identifier received from the general-purpose processing unit 10, the proxy obtaining unit 11 issues a data get request to the communication node 3 via the network 2 on behalf of the general-purpose processing unit 10 (SEQ102). In response to that request, the communication node 3 sends, to the communication apparatus 1, the data that is identified by the data obtaining method identifier (SEQ103). That data is received by the proxy obtaining unit 11 on behalf of the general-purpose processing unit 10.

Then, the proxy obtaining unit 11 analyzes the received data and extracts the data obtaining method identifier embedded in that data (SEQ104). At that time, there is a possibility that a plurality of data obtaining method identifiers is embedded in the data. In that case, the proxy obtaining unit 11 extracts all data obtaining method identifiers embedded in that data.

Upon extracting at SEQ104 the data obtaining method identifier embedded in the data received from the communication node 3, the proxy obtaining unit 11 performs a data obtaining operation according to the data obtaining method identifier (Step S100). More specifically, during Step S100, the proxy obtaining unit 11 requests the communication node 3 for data according to the data obtaining method identifier (SEQ105). In response to that request, the data that was sent by the communication node 3 to the communication apparatus 1 is sent to and received by the proxy obtaining unit 11 (SEQ106). Then, the proxy obtaining unit 11 temporarily holds the data in a memory.

During Step S100, the proxy obtaining unit 11 performs the data obtaining operation regarding each data obtaining method identifier extracted at SEQ104. That is, if a plurality of data obtaining method identifiers is extracted at SEQ104, the proxy obtaining unit repeats the data obtaining operation during Step S100 for the same number of times as the number of extracted data obtaining method identifiers.

Meanwhile, if the general-purpose processing unit 10 has switched to the sleep after the operation at SEQ101 mentioned above, then it is reinstated from the sleep mode at a predetermined timing (SEQ107). For example, the general-purpose processing unit 10 can be automatically reinstated from the sleep mode by means of a timer operation.

However, that is not the only possible case. Alternatively, the proxy obtaining unit 11 can be configured to control the operating mode of the general-purpose processing unit 10. For example, at the point of time when the data obtaining operation during Step S100 is completed regarding each data obtaining method identifier extracted at SEQ104, the proxy obtaining unit 11 reinstates the general-purpose processing unit 10 from the sleep mode. Still alternatively, while the proxy obtaining unit 11 is performing the data obtaining operation during Step S100, the general-purpose processing unit 10 can be reinstated from the sleep mode. In that case, for example, the proxy obtaining unit 11 can send the data obtained till that point of time to the general-purpose processing unit 10.

Upon being reinstated from the sleep mode, the general-purpose processing unit 10 sends a request to the proxy obtaining unit 11 for the data obtained by it as a response to the data get request issued at SEQ101 mentioned above (SEQ108). In response, to the general-purpose processing unit 10, the proxy obtaining unit 11 sends the data that is obtained by performing the data obtaining operation during Step S100 (SEQ109). In the general-purpose processing unit 10, the application that has started running at SEQ100 processes the data sent by the proxy obtaining unit 11.

Meanwhile, along with a data get request and the data obtaining method identifier, when the general-purpose processing unit 10 also sends the storage information at SEQ101 mentioned above; the data obtained by performing the data obtaining operation during Step S100 is stored in a memory of the general-purpose processing unit 10 at SEQ109 according to the storage method specified in the storage information.

With the operations performed in the manner described above, during a time period A starting from the time when the general-purpose processing unit 10 sends a data get request with respect to the communication node 3 up to the time when the general-purpose processing unit 10 requests the proxy obtaining unit 11 at SEQ108 for the obtained data, the general-purpose processing unit 10 can switch into the sleep mode. As a result, the power consumption of the communication apparatus 1 can be reduced at the time of issuing the data get request to the communication node 3.

Specific Example of Operations According to the First Embodiment

The operations according to the first embodiment are explained with reference to a specific example. As an example, it is assumed that the Internet is used as the network 2 and a Web server on the Internet is used as the communication node 3. Herein, the explanation is given for a case in which the communication apparatus 1 starts a browser application in the general-purpose processing unit 10, and then the browser is used to view contents data held by the communication node 3 via the network 2. The contents data is provided in the form of, for example, a Web page corresponding to an HTML file. Besides, the Web page can contain other contents data such as image data or video data.

In this case, in the communication apparatus 1, a browser starts running in the general-purpose processing unit 10 (SEQ100). With respect to the browser, the URL of the intended HTML file is input as the data obtaining method identifier by means of a selection from the bookmarks or by means of a direct input. Then, with respect to the network 2, the browser sends a File get request for obtaining the HTML file identified by the data obtaining method identifier as well as sends the data obtaining method identifier (SEQ101). That File get request and the data obtaining method identifier are once received by the proxy obtaining unit 11.

On behalf of the general-purpose processing unit 10, the proxy obtaining unit 11 sends the File get request and the data obtaining method identifier to the communication node 3, which is a Web server, via the network 2 (SEQ102). The communication node 3 receives the File get request and the data obtaining method identifier, and accordingly sends back an HTML file to the communication apparatus 1 (SEQ103).

FIG. 3 illustrates an example of the details of an HTML file sent by the communication node 3 to the communication apparatus 1 at SEQ103. In the example illustrated in FIG. 3, the numbers mentioned at the start of all lines represent line numbers used for explanatory purposes.

With respect to a tag that is used in displaying contents data such as image data or video data on a Web page; a data obtaining method identifier is embedded for the purpose of obtaining the contents data. Various such tags are defined in the HTML. For example, a tag <img src> is defined that indicates embedding of image data, a tag <body background> is defined to display image data as a background image, and a tag <object data> is defined to embed a multimedia component or a Java (registered trademark) applet. With respect to each such tag, a data obtaining method identifier is embedded in the form of a URL sandwiched between a pair of double quotation marks ("). While reading the HTML file, the browser issues a data get request for obtaining the data identified by the data obtaining method identifiers embedded with respect to the abovementioned tags.

In the example illustrated in FIG. 3, in an HTML file 50, data obtaining method identifiers are embedded at the fifth line, the seventh line, the 13-th to 16-th lines, the 19-th line, and the 20-th line. More particularly, at the fifth line, the tag <body background> is written and a URL that specifies an absolute path for the image data of a background image is embedded as a data obtaining method identifier. At each of the seventh line, the 13-th to 16-th line, and the 20-th line; the tag <img src> is written and a URL that specifies image data is embedded as a data obtaining method identifier. Of those URLs, the URLs of the image data written at the seventh line, the 16-th line, and the 20-th line are specified using relative paths; while the URLs of the image data written at the 13-th to 15-th line are specified with absolute paths.

At the 19-th line, the tag <object data> is written and a URL that specifies an absolute path for the video data of a video is embedded as a data obtaining method identifier. Herein, at the 19-th line, values specified in "type", "width", and "height" represent parameters that indicate the attributes of the video data.

At the 20-th line, an anchor tag <a href "(URL)"></a> indicates the path for the HTML file specified by the URL in that anchor tag. By performing a predetermined operation in the browser with respect to this anchor tag, the HTML file located at the corresponding path is accessed. Since the reading of the HTML file is not accompanied by automatic issuing of a get request from the browser, the URL in the anchor tag is not considered as a data obtaining method identifier according to the embodiments.

Upon receiving the HTML file 50 described above, the proxy obtaining unit 11 analyzes the HTML file 50 and extracts the data obtaining method identifiers from the HTML file 50 at SEQ104. For example, the proxy obtaining unit 11 performs line-by-line decoding of the description in the HTML file 50; searches for the tags such as the tag <img src>, the tag <body background>, and the tag <object data> having data obtaining method identifiers embedded therein; and extracts those data obtaining method identifiers from the tags.

According to the data obtaining method identifiers extracted at SEQ104, the proxy obtaining unit 11 performs the data obtaining operation during Step S100. Herein, the data obtaining operations is performed regarding each data obtaining method identifier extracted from the HTML file 50.

In the example illustrated in FIG. 3, as a result of the data obtaining operation, the image data and the video data written at the fifth line, the seventh line, the 13-th to 16-th lines, the 19-th line, and the 20-th line is sequentially obtained from the communication node 3 via the network 2. Then, the image data and the video data is temporarily stored in a memory of the proxy obtaining unit 11.

Herein, the explanation is given under the assumption that, while performing the data obtaining operation during Step S100 in a repeated manner, the data get requests are issued to the same destination. However, that is not the only possible case. Alternatively, each data obtaining method identifier may indicate a different communication node 3 as the destination for the corresponding data get request.

Moreover, herein, the explanation is given for an example of extracting file obtaining method identifiers embedded in HTML tags. However, that is not the only possible case. Alternatively, for example, it is also possible to extract file obtaining method identifiers that are embedded in a script language such as JavaScript (registered trademark) written in an HTML file. Moreover, it is also possible to extract file obtaining method identifiers embedded in HTML data that is dynamically generated using the PHP (which stands for Hypertext Preprocessor).

When the general-purpose processing unit 10 is reinstated from the sleep mode at SEQ107 and when a data get request is issued to the proxy obtaining unit 11 at SEQ108, the proxy obtaining unit 11 sends to the general-purpose processing unit 10 the image data and the video data obtained by performing the data obtaining operation during Step S100 (SEQ109).

Second Embodiment

Figure 4:
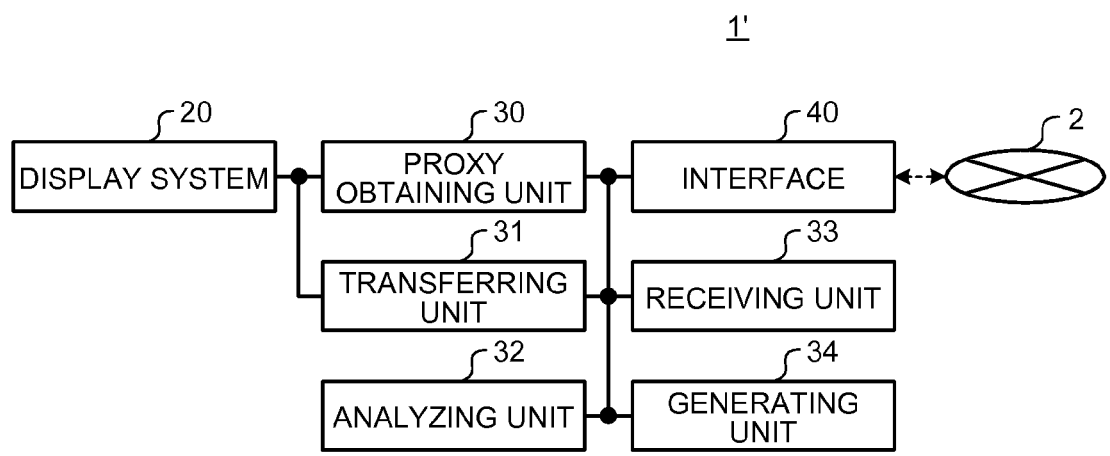
FIG. 4 is a functional block diagram illustrating exemplary functions of a communication apparatus according to a second embodiment.

Given below is the explanation regarding a second embodiment. FIG. 4 illustrates exemplary functions of a communication apparatus 1' according to the second embodiment. The communication apparatus 1' includes a display system 20, a proxy obtaining unit 30, a transferring unit 31, an analyzing unit 32, a receiving unit 33, a generating unit 34, and an interface 40.

The display system 20 has the functions equivalent to the general-purpose processing unit 10 described above. The display system 20 runs an OS and various applications. From among the functions performed by the general-purpose processing unit 10, since the browser function is the primary function in the second embodiment, the display system 20 is put to practice. For example, the display system 20 includes a CPU, a RAM, and a ROM. Thus, computer programs such as an operating system (OS) or application software run with the RAM serving as a work memory. In addition, the display system 20 includes a display control unit that converts display control signals, which are generated by the CPU by following instructions from computer programs, into signals that can be displayed on a display device such as a liquid crystal display (LCD). Herein, the display system 20 may include the display device.

The interface 40 controls the communication performed via the network 2. For example, the interface 40 enables communication between the communication apparatus 1' and communication nodes (not illustrated) that are connected to the network 2. The proxy obtaining unit 30 receives data get requests that are sent by the display system 20 with respect to the network 2. Then, on behalf of the display system 20, the proxy obtaining unit 30 issues that data get request to the network 2. Besides, the proxy obtaining unit 30 issues reception requests regarding reception packets to the receiving unit 33.

Generally, during the transfer of a file via the network 2, the data of that file is divided into packets of a predetermined size, and then the packets are transferred. In a packet, the information indicating the file to which the data belongs and the information indicating the location of the data in that file is written as, for example, header information of that packet.

In response to a reception request issued by the proxy obtaining unit 30, the receiving unit 33 receives reception packets that are sent via the network 2 and that are received by the interface 40. Then, the receiving unit 33 holds therein the reception packets.

The generating unit 34 receives a generation request issued by the receiving unit 33 and accordingly performs data generation by converting the data that is stored in the reception packets, which are received by the receiving unit 33, into a predetermined different data format. More particularly, the generating unit 34 retrieves data from the reception packets received and held by the receiving unit 33. Then, based on the header information of the reception packets, the generating unit 34 generates a file of a predetermined format from the retrieved data. Alternatively, from the data stored in the reception packets, the generating unit 34 can also generate stream data of a predetermined format.

Thus, regarding the operation of generating a file from reception packets as performed by the generating unit 34, it can be said in other words that it is an operation of converting reception packets into a file. In an identical manner, regarding the operation of generating stream data from reception packets as performed by the generating unit 34, it can be said in other words that it is an operation of converting reception packets into stream data. Meanwhile, the data generated by the generating unit 34 by converting reception packets is not limited to the data format of a file or stream data.

The analyzing unit 32 analyzes, in response to an analysis request, a file generated by the generating unit 34 and extracts the data obtaining method identifiers specified in that file. The transferring unit 31 transfers, in response to a transfer request, a file generated by the generating unit 34 to a specified location.

With reference to the configuration of a commonly-used computer, the display system 20 corresponds to the main body of the computer that includes a CPU, a RAM, a ROM, and a storage device. In contrast, the proxy obtaining unit 30, the transferring unit 31, the analyzing unit 32, the receiving unit 33, the generating unit 34, and the interface 40 are connected to the computer and correspond to a network interface card (NIC) that controls the communication with the network 2. In that case, the proxy obtaining unit 30, the transferring unit 31, the analyzing unit 32, the receiving unit 33, and the generating unit 34 are configured with computer programs that run in, for example, a microprocessor inside the NIC. In contrast, the interface 40 is actually connected to a cable and is configured with hardware that performs electric processing. Of course, that is not the only possible case. Alternatively, the proxy obtaining unit 30, the transferring unit 31, the analyzing unit 32, the receiving unit 33, and the generating unit 34 can each be configured with hardware.

Figure 5:
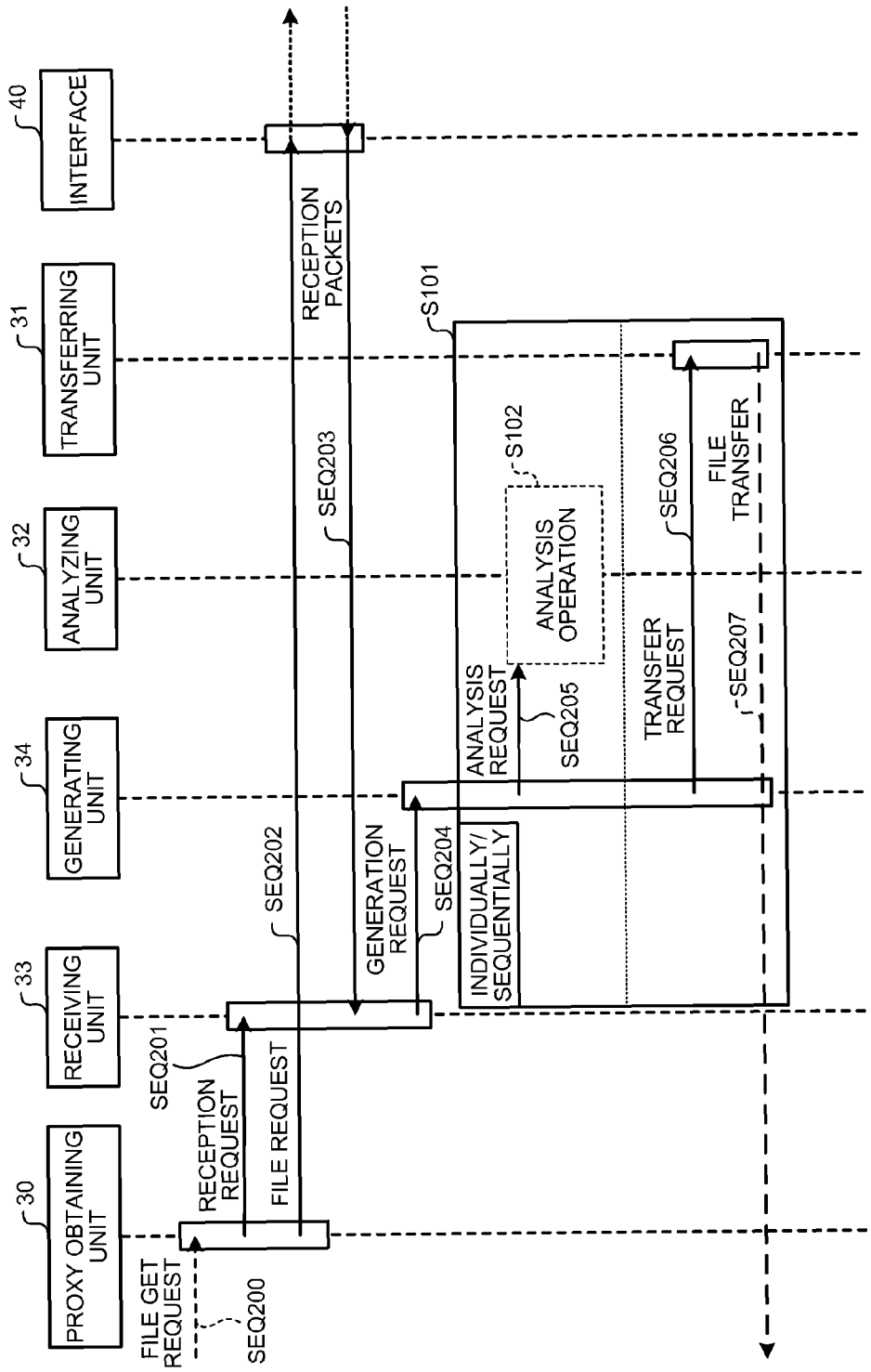
FIG. 5 is a sequence diagram illustrating an example of the data obtaining operation according to the second embodiment.

FIG. 5 is a sequence diagram illustrating an example of the data obtaining operation according to the second embodiment. In the following explanation, it is assumed that the communication apparatus 1' starts a browser in the display system 20 and views, via the network 2 that is the Internet, a Web page corresponding to a HTML file held by a communication node (not illustrated) that is a Web server.

Firstly, when the display system 20 requires a file that is present in a communication node connected to the network 2; the display system 20 sends a file get request and file obtaining related information, which is related to obtaining the file using the file get request, with respect to the network 2 (SEQ200). Upon sending a file get request at SEQ200, the display system 20 can switch to the sleep mode.

The file obtaining related information contains a file obtaining method identifier that indicates the method of obtaining the file from the corresponding communication node; contains a method of storing the file obtained in response to a file get request; contains storage information that specifies the location of storing the file; and contains request flags representing a generation request and an analysis request.

A file obtaining method identifier specified in a set of file obtaining related information can be in the form of a uniform resource identifier (URI) or a URL. In the following explanation, unless otherwise specified, a URL is used as the representative of a URI and a URL. The storage information contains information for identifying the storage device (such as a hard disk drive (HDD) or a nonvolatile semiconductor memory) in which the obtained file is to be stored, contains the address at which the file is to be stored in the storage device, and contains the method of communicating with the storage device.

A file get request and file obtaining related information that is sent by the display system 20 with respect to the network 2 is once received by the proxy obtaining unit 30. With that, the proxy obtaining unit 30 gets requested by the display system 20 to perform a file receiving operation (SEQ200). Based on the file get request and the file obtaining related information that is received; the proxy obtaining unit 30 issues a request, on behalf of the display system 20, for the corresponding file to a communication node (not illustrated) that is connected to the network 2 (SEQ202).

For example, when the HTTP is used while performing communication via the network 2, the request for a file and the obtaining of a file is performed using the GET method and the POST method, respectively, that are defined in the HTTP. Moreover, for example, when the file transfer protocol (FTP) is used while performing communication via the network 2, the request for a file and the obtaining of a file is performed using the tag "RETR" that is defined in the FTP. Meanwhile, it is assumed that, on behalf of the display system 20, the proxy obtaining unit 30 is capable of performing the operations that need to be performed in advance with the network 2 prior to issuing a file get request.

Along with issuing a file get request, the proxy obtaining unit 30 requests the receiving unit 33 to receive the reception packets from the interface 40 (SEQ201).

In response to the file get request issued at SEQ202, the reception packets sent via the network 2 are received by the interface 40. Then, the reception packets are transferred to the receiving unit 33 and are held therein. For example, once all reception packets constituting a single file are received, the receiving unit 33 performs flag determination based on the generation request flag and the analysis request flag that are specified in the file obtaining related information obtained from the proxy obtaining unit 30.

Given below is the explanation regarding the flag determination performed by the receiving unit 33. The flag determination by the receiving unit 33 is performed for the following three cases: (1) when neither the generation request flag nor the analysis request flag is set to ON; (2) when the generation request flag is set to ON; and (3) when the generation request flag is not set to ON but the analysis request flag is set to ON. When the generation request flag is set to ON as mentioned in case (2), the flag determination regarding the analysis request flag is performed later by the generating unit 34.

Firstly, the explanation is given regarding case (1) when neither the generation request flag nor the analysis request flag is set to ON. In case (1), to the transferring unit 31, the receiving unit 33 sends all reception packets (hereinafter, referred to as "packet group") received at SEQ203 as well as sends a transfer request (not illustrated) for transferring the reception packets. The transfer request can contain the storage information that is specified in the file obtaining related information received at SEQ200. Upon receiving the packet group and the transfer request, the transferring unit 31 transfers the packet group to, for example, the storage destination specified in the storage information.

The following explanation is given regarding case (2) when the generation request flag is set to ON. In case (2), the receiving unit 33 sends a file generation request as well as generation-related information to the generating unit 34 (SEQ204). The generation-related information contains storage information indicating the location of storing the generated file and the method of storing the generated file, as well as contains an analysis flag. Subsequently, the system control proceeds to an analyzing and obtaining operation performed during Step S101.

During Step S101, according to the generation request sent by the receiving unit 33, the generating unit 34 generates a file based on the header information in each packet of the packet group. That is, the generating unit 34 restores the original data by arranging the data stored in each reception packet according to, for example, data position indicating information specified in the header information, and generates a file. Upon generating the file, the generating unit 34 sends to the analyzing unit 32 an analysis request for analyzing the file and first analysis-related information (SEQ205). The first analysis-related information contains the file generated by the generating unit 34 and contains storage information indicating the location and method of storing the generated file and the analysis result. Meanwhile, the generating unit 34 holds the generated file in a memory.

The following explanation is given regarding case (3) when the generation request flag is not set to ON but the analysis request flag is set to ON. In case (3), to the analyzing unit 32, the receiving unit 33 issues an analysis request for analyzing the packet group as well as sends second analysis-related information (not illustrated). The second analysis-related information contains the packet group and contains storage information indicating the location and method of storing the packet group and the analysis result.

Returning to the explanation with reference to FIG. 5, explained below is an analysis operation performed by the analyzing unit 32 for analyzing a file or a packet group. Upon receiving an analysis request and the first analysis-related information from the generating unit 34 at SEQ205 mentioned above or upon receiving an analysis request and the second analysis-related information from the receiving unit 33, the analyzing unit 32 analyzes the file or the packet group and extracts file obtaining method identifiers, which indicate the method of obtaining the embedded files, from the file or the packet group (Step S102). Herein, the analyzing unit 32 extracts all file obtaining method identifiers included in the file or the packet group.

In the case of analyzing a packet group, the analyzing unit 32 restores the original data by arranging the data in the reception packets in a predetermined order based on, for example, the header information of the reception packets; and performs analysis with respect to the restored data.

Figure 6:
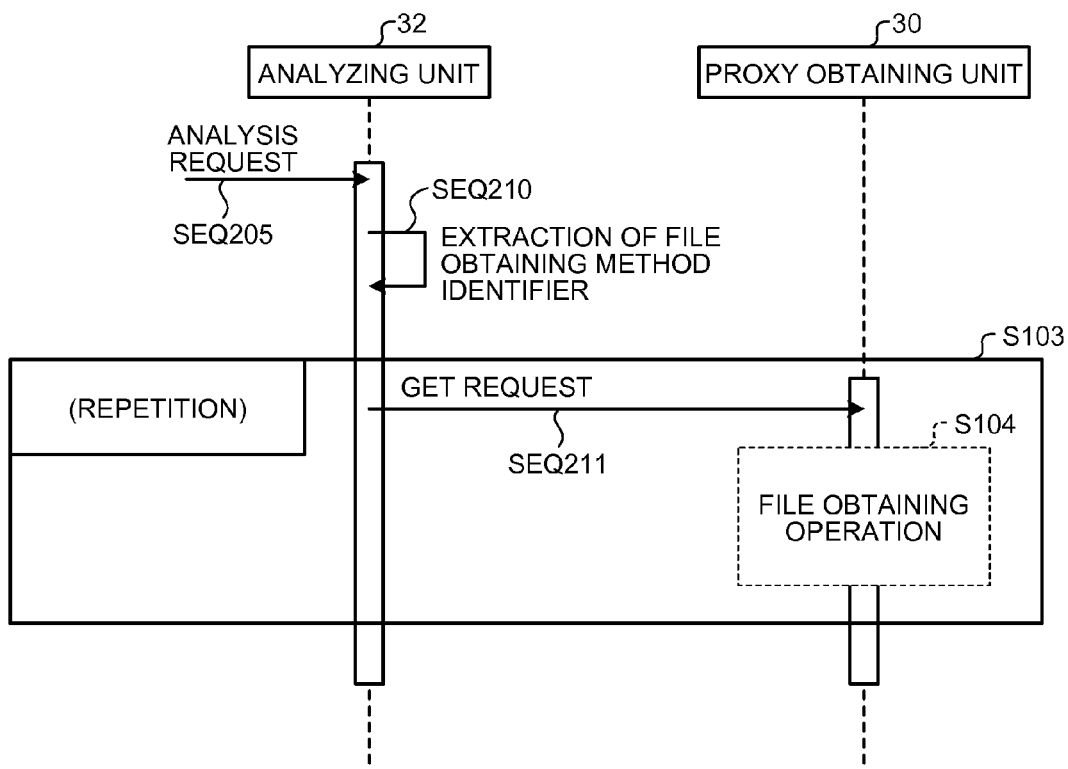
FIG. 6 is a sequence diagram for illustrating an analysis operation for analyzing a file or a packet group according to the second embodiment.

The analysis operation performed during Step S102 for analyzing a file or a packet group is performed in a recursive manner. FIG. 6 is a sequence diagram for illustrating in detail the operation performed during Step S102. Herein, it is assumed that the generation request flag as well as the analysis flag is set to ON, and that the analysis of a file is performed based on the analysis request and the first analysis-related information received from the generating unit 34 at SEQ205.

Meanwhile, in the case when the generation request flag is not set to ON but the analysis request flag is set to ON, the analysis operation is substantially identical to the following explanation except for the difference of either generating or not generating the file. Hence, separate explanation of that case is not given.

In response to the analysis request, the analyzing unit 32 analyzes the file specified in the first analysis-related information and extracts all file obtaining method identifiers specified in that file (SEQ210). Then, the system control proceeds to Step S103. During Step S103, regarding each of the extracted file obtaining method identifiers, the analyzing unit 32 sends to the proxy obtaining unit 30 a file get request for obtaining the file indicated by that file obtaining method identifier as well as sends the first analysis-related information containing that file obtaining method identifier (SEQ211). Then, in response to each analysis request that is received, the proxy obtaining unit 30 performs the operations starting from SEQ201 mentioned above so as to obtain the file that is indicated by the file obtaining method identifier specified in the first analysis-related information (Step S104).

Explained below in detail is the operation performed during Step S104. The proxy obtaining unit 30 issues a request to the receiving unit 33 for receiving the reception packets (SEQ201) as well as requests a communication node (not illustrated), which is connected to the network 2, for files identified by the file obtaining method identifiers (SEQ202). In response to the request, the receiving unit 33 receives the reception packets from the interface 40 (SEQ203). Then, for example, the receiving unit 33 sets the generation request flag to ON as well as sets the analysis request flag to ON; generates generation-related information that contains the generation request flag, the analysis request flag, the packet group, and the storage information; and sends the generation-related information and a generation request to the generating unit 34 (SEQ204).

In response to the generation request, the generating unit 34 generates a file from the packet group included in the generation-related information and holds the generated file in a memory. Then, the generating unit 34 creates analysis-related information that contains the generated file, the analysis request flag, and the storage information; and sends the analysis-related information to the analyzing unit 32 (SEQ205). Subsequently, the analyzing unit 32 analyzes the file during Step S102 and extracts file obtaining method identifiers.

When the files that are identified by the file obtaining method identifiers obtained during analysis do not contain any more file obtaining method identifiers, the analysis operation performed recursively during Step S102 mentioned above ends.

Once the analysis operation performed in a recursive manner ends, the generating unit 34 sends to the transferring unit 31 a transfer request for transferring one or more generated files that are held in the memory as well as sends transfer-related information that contains the storage information indicating the location and method of storing the generated files (SEQ206). In response to the transfer request, the transferring unit 31 transfers one or more files specified in the transfer-related information according to the storage information (SEQ207).

In the description given above, in response to an analysis request, the analyzing unit 32 extracts file obtaining method identifiers from a file. However, in practice, the analyzing unit 32 also extracts data obtaining method identifiers from that file. The operation of obtaining the data obtaining method identifiers is substantially identical to the file obtaining operation expect for the fact that file obtaining method identifiers are also extracted from the obtained file.

For example, with reference to FIG. 6, when an analysis request and the first analysis-related information is sent by the generating unit 34 at SEQ205, the analyzing unit 32 analyzes the file specified in the first analysis-related information and extracts all data obtaining method identifiers specified in that file. Then, regarding each extracted data obtaining method identifier, the analyzing unit 32 sends to the proxy obtaining unit 30 a data get request for obtaining the data indicated by that data obtaining method identifier as well as sends that data obtaining method identifier and the storage information indicating the location and method of storing the obtained data (SEQ211). During Step S104, in response to the data get request that is received, the proxy obtaining unit 30 performs the operations starting from SEQ201 mentioned above so as to obtain the data identified by the data obtaining method identifier. Then, for example, the obtained data is converted into a file and stored in a memory by the generating unit 34.

Meanwhile, the file obtaining related information sent by the display system 20 to the proxy obtaining unit 30 can also contain the information regarding the condition that needs to be satisfied so as to reinstate the display system 20 from the sleep mode as well as the information regarding the method for reinstating the display system 20 from the sleep mode. The proxy obtaining unit 30 performs control in such a way that, when the constituent elements of the communication apparatus 1' satisfy that condition, the display system 20 is reinstated from the sleep mode.

Herein, various conditions can be set for reinstating the display system 20 from the sleep mode. For example, timer control can be performed in such a way that, when a predetermined period of time elapses since the display system 20 has switched to the sleep mode, the proxy obtaining unit 30 reinstates the display system 20 from the sleep mode. Alternatively, a startup instruction issued from outside and received via the interface 40 can also be set as the condition. Still alternatively, a predetermined request issued by at least one of the proxy obtaining unit 30, the receiving unit 33, the generating unit 34, the analyzing unit 32, and the transferring unit 31 can be set as the condition. Still alternatively, the total size of the reception packets or the total size of the reception files received by the interface 40 can also be set as the condition. Still alternatively, for example, the operating state of another device connected to the communication apparatus 1' can also be set as the condition.

Meanwhile, in the description given above, only after receiving all reception packets constituting a single file, the receiving unit 33 sends the packet group to the generating unit 34. However, that is not the only possible case. Alternatively, while receiving the reception packets constituting a single file, the receiving unit 33 can keep on sending the already-received reception packets to the generating unit 34. Moreover, in the description given above, only after the generating unit 34 generates a file, the analyzing unit 32 analyzes that file and then the transferring unit 31 transfers that file. However, that is not the only possible case. Alternatively, for example, generation of files by the generating unit 34, analysis of files by the analyzing unit 32, and transferring of files by the transferring unit 31 can be concurrently performed.

As described above, according to the second embodiment, as soon as the display system 20 sends a file get request and file obtaining related information with respect to the network 2, the display system 20 can switch to the sleep mode. As a result, the power consumption of the communication apparatus 1' can be reduced at the time of issuing a data get request with respect to the network 2.

Moreover, according to the second embodiment, since the file obtaining method identifiers are extracted in a recursive manner, it becomes possible to deal with a situation when a file identified by an extracted file obtaining method identifier further contains file obtaining method identifiers.

Specific Example of Operations According to the Second Embodiment

The operations according to the second embodiment are explained with reference to a specific example. As an example, in an identical manner to the first embodiment, the explanation is given for a case in which the network 2 is the Internet, and the communication apparatus 1' starts a browser application in the display system 20 and then the browser is used to view a Web page corresponding to an HTML file identified by a URL in a Web server (not illustrated) that is connected to the network 2. In the following example, it is assumed that the generation request flag as well as the analysis flag is set to ON. Moreover, it is assumed that the operation of generating a file from reception packets is performed and the operation of analyzing that file is also performed.

Furthermore, in the following explanation, it is assumed that an HTML file, for which the display system 20 issues a get request with respect to the network 2, contains a file obtaining method identifier that automatically calls another HTML file. A typical example of such an HTML file is the HTML file for displaying a screen using frames. The frames partition a single screen; and, with respect to each partitioned area, the display is performed generally using different HTML files.

The explanation regarding the HTML files for frame display is given below with reference to FIGS. 7 and 8. Herein, a frame is displayed with an HTML file that is used to define the frame (hereinafter, referred to as "frame defining file") and with two or more HTML files that are used to perform display in the partitioned areas of the frame (hereinafter, referred to as "in-frame page files").

FIG. 7 illustrates an example of a frame defining file 51. The frame is defined in a tag <frameset> written at the sixth line. In this example, in tags <frame name> written at the seventh and eighth lines, file obtaining method identifiers are embedded, each of which points to an in-frame page file that is used in displaying a partitioned area of the frame. That is, the file obtaining method identifiers of in-frame page files are embedded as URLs (in this example, relative URLs), each of which is sandwiched between a pair of double quotation marks with respect to a parameter "src" of the corresponding tag <frame name>. At the time of obtaining the frame defining file 51, the display system 20 needs to obtain the files that are identified by the file obtaining method identifiers embedded in the tags <frame name>.

In the frame defining file 51, generally, there is no description of data obtaining method identifiers of contents data such as image data or video data. Even if such description is found, it is ignored (in the case of a browser complying with frames).

FIGS. 8A and 8B respectively illustrate in-frame page files 52 and 53 that are identified by the file obtaining method identifiers embedded in the tags <frame name> written at the seventh and eighth lines in the frame defining file 51. In the in-frame page file 52, data obtaining method identifiers are embedded at the fifth line, the eighth line, the ninth line, and the 10-th line. Similarly, in the in-frame page file 53, data obtaining method identifiers are embedded at the fifth line, the ninth line, the 10-th line, and the 11-th line.

In response to a generation request issued by the receiving unit 33 at SEQ204 illustrated in FIG. 5, the generating unit 34 generates the frame defining file 51 from the reception packets received from the interface 40. Then, during Step S101, the generating unit 34 sends an analysis request and the first analysis-related information to the analyzing unit 32 at SEQ205. Then, during Step S102, in response to the analysis request, the analyzing unit 32 analyzes the frame defining file 51 and extracts the frame obtaining method identifiers and the data obtaining method identifiers embedded in the frame defining file 51 (see FIG. 6, SEQ210). In this example, the file obtaining method identifiers are extracted from the seventh and eighth lines of the frame defining file 51. However, no data obtaining method identifier is extracted from the frame defining file 51.

Then, the system control proceeds to Step S102. Regarding each file obtaining method identifier that is extracted, the analyzing unit 32 sends to the proxy obtaining unit 30 a file get request for obtaining the file identified by that file obtaining method identifier as well as sends the first analysis-related information containing that file obtaining method identifier (SEQ211). During Step S104, in response to the file get request, the proxy obtaining unit 30 performs operations starting from SEQ201 illustrated in FIG. 5 so as to obtain the file that is identified by the file obtaining method identifier specified in the first analysis-related information.

Then, to the analyzing unit 32, analysis requests are issued for analyzing the in-frame page files 52 and 53 that have been obtained (SEQ205). In response to the analysis requests, the analyzing unit 32 analyzes each of the in-frame page files 52 and 53, and extracts file obtaining method identifiers and data obtaining method identifiers.

For example, in the in-frame page file 52 illustrated in FIG. 8A, data obtaining method identifiers are extracted from the fifth line, the eighth line, the ninth line, and the 10-th line. Similarly, in the in-frame page file 53 illustrated in FIG. 8B, data obtaining method identifiers are extracted from the fifth line, the ninth line, the 10-th line, and the 11-th line. Meanwhile, no file obtaining method identifiers are extracted from the in-frame page files 52 and 53.

Regarding each data obtaining method identifier that is extracted, the analyzing unit 32 sends to the proxy obtaining unit 30 a data get request for obtaining the data identified by that data obtaining method identifier as well as sends the first analysis-related information containing that data obtaining method identifier (SEQ211). In response to each data get request, the proxy obtaining unit 30 performs operations starting from SEQ201 mentioned above so as to obtain the data identified by the data obtaining method identifier specified in the first analysis-related information. Each set of obtained data is converted into, for example, a contents file and is stored in a memory by the generating unit 34.

In this case, since no file obtaining method identifier is extracted from the in-frame page files 52 and 53, there is no need for the analyzing unit 32 to continue with the analysis operation. Herein, for example, by setting the analysis request flag to OFF, it becomes possible to ensure that the analysis operation after SEQ205 is not performed by the analyzing unit 32.

Once the recursive analysis operation accompanying the analysis of the frame defining file 51 ends, the generating unit 34 sends to the transferring unit 31 a transfer request for transferring one or more generated files that are held in a memory, as well as sends transfer-related information containing the generated files and storage information that indicates the location and method of storing the generated files. In response to the transfer request, the transferring unit 31 transfers one or more files specified in the transfer-related information according to the storage information.

Meanwhile, in the first and second embodiments, the explanation is given for a case of extracting file obtaining method identifiers and data obtaining method identifiers that are embedded in HTML tags in an HTML file. However, that is not the only possible case. Alternatively, for example, it is also possible to extract file obtaining method identifiers or data obtaining method identifiers that are embedded in a script language such as JavaScript (registered trademark) written in an HTML file.

Configuration Example of Communication Apparatus Applicable to all Embodiments

Figure 9:
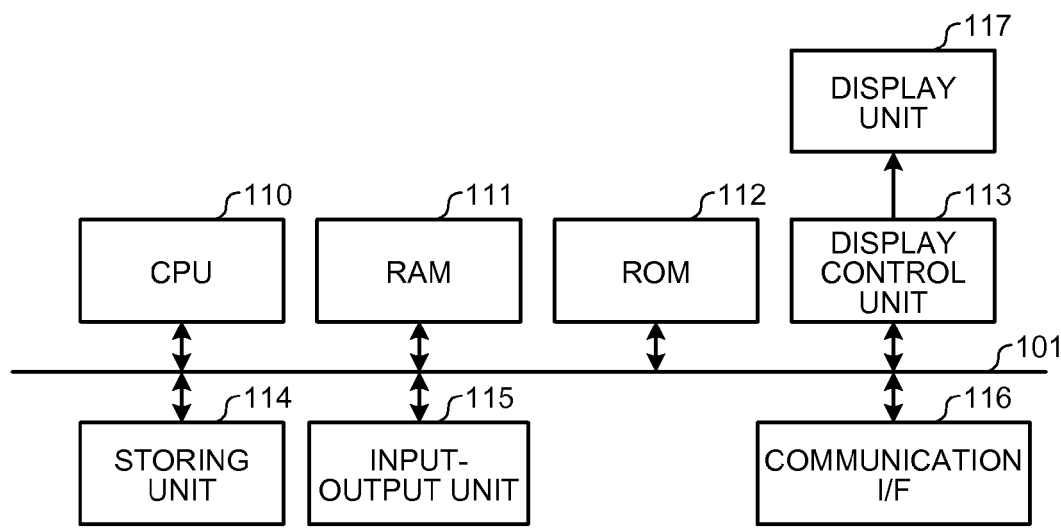
FIG. 9 is a block diagram illustrating an exemplary configuration of a communication apparatus that can be implemented in all embodiments.

FIG. 9 illustrates an exemplary configuration of a communication apparatus 100 that can be implemented in all embodiments described above. The communication apparatus 100 includes a CPU 110, a RAM 111, a ROM 112, a display control unit 113, a storing unit 114, an input-output unit 115, and a communication interface (I/F) 116. All these constituent elements are connected to each other in a communicable manner by a bus 101. The storing unit 114 is a large-capacity rewritable memory medium such as a hard disk drive (HDD), a solid state disk (SSD), or a nonvolatile semiconductor memory. The storing unit 114 is used to store an OS or various computer programs required for the operations of the CPU, or to store a variety of data.

The CPU 110 follows instructions of the computer programs that are stored in advance in the storing unit 114 or the ROM 112, uses the RAM 111 as a work memory, and comprehensively controls the operations of the communication apparatus 100. The general-purpose processing unit 10 according to the first embodiment or the display system 20 according to the second embodiment is put to practice with computer programs running in the CPU 110.

The display control unit 113 is connected to a display unit 117 that includes a display device such as an LCD. The display control unit 113 convers display control signals, which are generated by the CPU 110 according to a computer program, into signals that are in a displayable form for the display device. The display unit 117 can be installed inside the communication apparatus 100 or can be externally connected to the communication apparatus 100.

The input-output unit 115 includes an input device such as a mouse, as an example of a pointing device, or a keyboard for receiving user operations. However, the input device is not limited to a specific hardware component such as a keyboard. Alternatively, the input device can be, what is called, a touch-sensitive panel that is integrally configured with, for example, the display device of the display unit 117 and that outputs control signals depending on the pressed portion thereof. Meanwhile, the input-output unit 115 can also include a communication interface, such as a universal serial bus (USB) or IEEE 1394 (IEEE stands for Institute of Electrical and Electronics Engineers), for performing data transfer. Moreover, the input-output unit 115 can also include a drive device for performing read-write operations with respect to a disk memory such as a compact disk (CD) or a digital versatile disk (DVD).

The communication I/F 116 follows instructions from the CPU 110 and controls communication performed with an external network such as the Internet or a local area network (LAN). The proxy obtaining unit 11 according to the first embodiment is implemented as a function of the communication I/F 116. Moreover, the proxy obtaining unit 30, the transferring unit 31, the analyzing unit 32, the receiving unit 33, the generating unit 34, and the interface 40 according to the second embodiment are implemented as a configuration and functions of the communication I/F 116. The communication I/F can be configured to control the operations of the CPU 110 by issuing instructions from the outside via the network or by means of operations of the communication I/F 116 itself.

Figure 10:
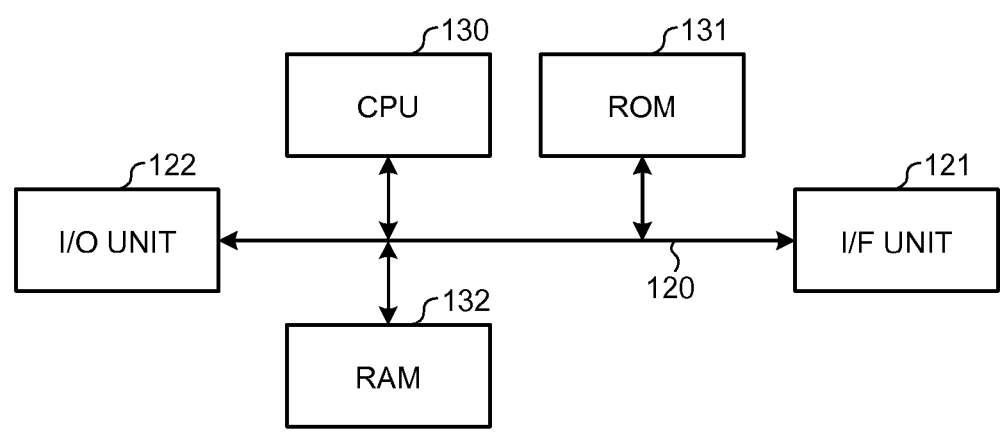
FIG. 10 is a block diagram illustrating an exemplary configuration of a communication I/F that can be implemented in all embodiments.

FIG. 10 illustrates an exemplary configuration of the communication I/F 116. The communication I/F 116 includes an interface (I/F) unit 121, an input-output (I/O) unit 122, a CPU 130, a ROM 131, and a RAM 132. All these constituent elements are connected to each other in a communicable manner by a bus 120. The communication I/F controls the physical connection with an external network, and has a MAC address (MAC stands for Media Access Control) that represents unique identification information of the communication I/F 116 on the network. The I/O unit 122 is a port that enables establishing a connection with the main body of the communication apparatus 100 (i.e., with the bus 101).

The CPU 130 follows instructions of the computer programs that are stored in advance in the ROM 131, uses the RAM 132 as a work memory, and controls the operations of the communication I/F 116. For example, the functions of the proxy obtaining unit 11 according to the first embodiment are implemented with a computer program running in the CPU 130. In an identical manner, the functions of the proxy obtaining unit 30, the transferring unit 31, the analyzing unit 32, the receiving unit 33, and the generating unit 34 according to the second embodiment are implemented with a computer program running in the CPU 130. Meanwhile, in the communication apparatus 1' according to the second embodiment, the interface 40 corresponds to the I/F unit 121 illustrated in FIG. 10.

Herein, the computer programs executed in the communication I/F 116 for the purpose of implementing the embodiments described above are stored in advance, for example, in the ROM 131. Alternatively, the computer programs executed in the communication I/F 116 for the purpose of implementing the embodiments described above can be recorded in the form of installable or executable files on a CD, a flexible disk (FD), or a DVD.

Still alternatively, the computer programs executed in the communication I/F 116 for the purpose of implementing the embodiments described above can be saved as downloadable files on a computer connected to the Internet or can be made available for distribution through a network such as the Internet. Still alternatively, the computer programs executed in the communication I/F 116 for the purpose of implementing the embodiments described above can be distributed over a network such as the Internet.

The computer programs executed in the communication I/F 116 for the purpose of implementing the embodiments described above contain modules for each of the abovementioned constituent elements (in the first embodiment, the proxy obtaining unit 11; in the second embodiment, the proxy obtaining unit 30, the transferring unit 31, the analyzing unit 32, the receiving unit 33, and the generating unit 34) to be implemented in a computer. In practice, for example, the CPU 130 reads a computer program from the ROM 131 and runs it such that the program is loaded in the RAM 132. As a result, either the module for the proxy obtaining unit 11 is generated in the RAM 132 or the modules for the proxy obtaining unit 30, the transferring unit 31, the analyzing unit 32, the receiving unit 33, and the generating unit 34 are generated in the RAM 132.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication apparatus comprising:
a communication interface to at least:
receive first obtaining method information sent by an information processing unit which changes to a low power consumption state after the first obtaining method information is sent, the first obtaining method information being sent to a network and indicating a method of obtaining first data from the network;
on behalf of the information processing unit, obtain the first data based on the received first obtaining method information; and
extract, from the obtained first data, second obtaining method information that indicates a method of obtaining second data which needs to be obtained, wherein
the communication interface also obtains the second data based on the second obtaining method information; and
the communication interface changes an operating state of the information processing unit from the low power consumption state to a normal operating state when the obtaining of the first data on behalf of the information processing unit is determined to be completed based on a result of the extracting, the information processing unit not changing from the low power consumption state to the normal operating state at a predetermined timing after the first obtaining method information is sent.

2. The apparatus according to claim 1, wherein the communication interface further transfers the obtained first data and the obtained second data to a specified storage location.

3. The apparatus according to claim 1, wherein the communication interface further performs an operation of recursively extracting, by using the second data as the first data.

4. The apparatus according to claim 1, wherein the communication interface further converts data format of the obtained first data and the obtained second data into a different data format.

5. A communication method comprising:
receiving, by a communication interface, first obtaining method information sent by an information processing unit which changes to a low power consumption state after the first obtaining method information is sent, the first obtaining method information being sent to a network and indicating a method of obtaining first data from the network;
obtaining, by the communication interface, on behalf of the information processing unit, the first data based on the received first obtaining method information; and
extracting, by the communication interface, from the obtained first data, second obtaining method information that indicates a method of obtaining second data which needs to be obtained, wherein
the obtaining also includes obtaining, by the communication interface, the second data based on the second obtaining method information, and the communication method further comprises changing, by the communication interface, an operating state of the information processing unit from the low power consumption state to a normal operating state when the obtaining of the first data, by the communication interface, on behalf of the information processing unit is determined to be completed based on a result of the extracting, the information processing unit not changing from the low power consumption state to the normal operating state at a predetermined timing after the first obtaining method information is sent.

6. A computer program product comprising a non-transitory computer-readable medium including program instructions for a communication method, wherein the instructions, when executed by a computer, cause a communication interface to perform at least:
receiving first obtaining method information sent by an information processing unit which changes to a low power consumption state after the first obtaining method information is sent, the first obtaining method information being sent to a network and indicating a method of obtaining first data from the network;
obtaining, on behalf of the information processing unit, the first data based on the first obtaining method information received at the receiving; and
extracting, from the obtained first data, second obtaining method information that indicates a method of obtaining second data which needs to be obtained, wherein
the obtaining also includes obtaining the second data based on the second obtaining method information, and
the instructions, when executed by the computer, cause the communication interface to further perform changing an operating state of the information processing unit from the low power consumption state to a normal operating state when the obtaining of the first data on behalf of the information processing unit is determined to be completed based on a result of the extracting, the information processing unit not changing from the low power consumption state to the normal operating state at a predetermined timing after the first obtaining method information is sent.

* * * * *